United States Patent Office 2,839,524
Patented June 17, 1958

2,839,524
ERYTHROMYCIN COMPOUNDS

Richard V. Heinzelman and Maxton F. Murray, Kalamazoo Township, Kalamazoo County, Mich., assignors to The Upjohn Company, Kalamazoo, Mich., a corporation of Michigan No Drawing. Application October 12, 1954
Serial No. 461,906

10 Claims. (Cl. 260—210)

This invention relates to new compounds and to a process for their production, and is particularly directed to a process in which erythromycin is condensed with an aromatic sulfo carboxylic inner anhydride of the lower benzene and naphthalene series and to the products obtained.

Erythromycin is an antibiotic having therapeutic utility. It is prepared by culturing Streptomyces erythreus NRRL 2338 in an erythromycin substrate medium. See Union of South Africa Patent No. 16,073, granted March 23, 1953 (U. S. Patent 2,653,899 granted September 29, 1953), and Antibiotics and Chemotherapy 2: 281–283 (June 1952).

It has now been found that erythromycin reacts with aromatic sulfo carboxylic inner anhydrides of the lower benzene and naphthalene series to form new compounds.

It is an object of the invention to provide a new process in which erythromycin is reacted with an aromatic sulfo carboxylic inner anhydride. It is a further object of the invention to provide new products obtained by reacting erythromycin with an aromatic sulfo carboxylic inner anhydride. Other objects of the invention will be apparent to those skilled in the art to which this invention pertains.

The compounds of the invention are prepared by reacting erythromycin with an aromatic sulfo carboxylic inner anhydride of the lower benzene and naphthalene series according to the following equation:

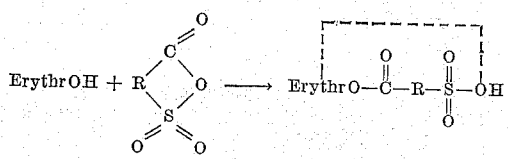

in which Erythr is the erythromycin radical, i. e., the radical obtained from erythromycin by the removal of a hydroxy radical, and R is the radical of an aromatic sulfo carboxylic inner anhydride of the lower benzene and naphthalene series. The term "aromatic sulfo carboxylic inner anyhdride of the lower benzene and naphthalene series" is used herein to designate anhydrides, as represented above, which are obtained by intramolecular abstraction of water from a carboxyl group and a sulfo group in the ortho- or peri-position of an aromatic sulfo carboxylic acid of the lower benzene and naphthalene series. For the most part R can simply be designated as a lower ortho-arylene radical of the benzene series or a peri-naphthalene radical. By "lower ortho-arylene radical of the benzene series" is meant ortho-phenylene and ortho-phenylene substituted one or more times by a lower molecular weight group such as lower alkyl, halogen, nitro, amino, and the like.

Ordinarily the reaction is carried out in a solvent. Any inert solvent which is a solvent for one of the reagents and advantageously for both can be used. The term "inert solvent" is used herein in accordance with the second definition of "solvent" in Hackh's Chemical Dictionary, Third Edition, to mean "A liquid which dissolves another substance without any change in chemical composition" in contradistinction to those types of solvents which dissolve by a chemical reaction. Suitable solvents include chloroform, ethylene dichloride, methylene chloride, carbon tetrachloride, isopropyl ether, dioxan, and the like, methylene chloride being preferred. The reaction ordinarily is carried out at room temperature or slightly lower, i. e., fifteen to thirty degrees centigrade. In some cases, especially where less reactive anhydrides are employed, gentle heating up to say about sixty degrees centigrade can be used. Also, if desired, the reaction mixture can be cooled. Thus in general, the temperature can range from about minus ten degrees centigrade to about sixty degrees centigrade.

The erythromycin and aromatic sulfo carboxylic inner anhydrides of the lower benzene and naphthalene series react in equivalent proportions, for example, one mole of erythromycin and one mole of aromatic sulfo carboxylic inner anhydride. Ordinarily, therefore, equivalent proportions are used. It is sometimes advantageous, however, to use an excess of the inner acid anhydride up to say about 25 percent excess. In general, however, the proportions are not critical except from an economic standpoint and the novel compounds of the invention are obtained over a wide range of proportions.

In carrying out the processes of the invention any aromatic sulfo carboxylic inner anhydride can be used. It is well known that inner anhydrides as a class are alcoholized readily by compounds having active hydroxyl hydrogen to form hydrolyzable mono esters and it has been found according to this invention that such an alcoholysis is also obtained with erythromycin to give erythromycin sulfo carboxylic acid mono esters but that the esters formed, surprisingly are not hydrolyzable. Aromatic sulfo carboxylic inner anhydrides which so react include o-sulfobenzoic acid anhydride; the lower alkyl derivatives thereof, exemplified by 4-methyl-2-sulfobenzoic anhydride, Weber, Ber. 25, 1742 (1892); Beil. 19, 113; the nitro and amino derivatives thereof exemplified by 4-nitro-2-sulfobenzoic anhydride and 4-amino-2-sulfobenzoic anhydride, Grob and Goldberg, Helv. Chim. Acta 32, 172–184 (1949); the halo derivatives thereof, exemplified by 3 - bromo-2-sulfobenzoic anhydride, 3,6-dichloro-2-sulfobenzoic anhydride, 3,6-dibromo-2-sulfobenzoic anhydride, 3,6-diiodo-2-sulfobenzoic anhydride, 3,5,6-triiodo-2-sulfobenzoic anhydride, ·3,5,6-tribromo-2-sulfobenzoic anhydride, 3,4,5,6 - tetrachloro-2-sulfobenzoic anhydride, 3,4,5,6-tetrabromo-2-sulfobenzoic anhydride, and 3,4,5,6-tetraiodo-2-sulfobenzenoic anhydride, Twiss and Farinholt, J. A. C. S. 58, 1561–5 (1936); and 8-sulfo-1 - naphthoic anhydride, Rule and Turner, J. Chem. Soc. 1935, 316–319; and the like.

The process of the invention can be applied to impure solutions of erythromycin, such as are obtained in processes for recovering erythromycin from its fermentation beer, to give a high quality product, notwithstanding the impurity of the solution. The process of the invention, therefore, is useful in upgrading crude erythromycin and in its recovery from fermentation beers. Thus erythromycin can be extracted from its fermentation beer with amyl acetate and/or methylene chloride, or like water-immiscible solvent or solvents, in one or more stage extractions and the resulting solution of impure erythromycin treated with an aromatic sulfo carboxylic inner anhydride according to the process of this invention and the precipitated ester filtered off and washed to give a specification grade product.

The novel compounds of this invention are solids, usually crystalline, and can be represented by the following general formula:

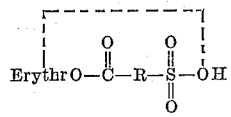

in which Erythr and R are as defined above. Available evidence indicates that the compounds of the invention are carboxylic acid esters and potentiometric titrations indicate that the sulfo group combines with the erythromycin moiety to form a very water-insoluble complex which, unlike the erythromycin dicarboxylic acid mono esters, is not solubilized by strong bases.

The following example is illustrative of the process and products of the invention, but is not to be construed as limiting.

Example 1.—Erythromycin o-sulfobenzoate ester

Fifty-five and two-tenths grams (0.30 mole) of o-sulfobenzoic anhydride was added portionwise over a period of thirty minutes to a well stirred solution of 222 grams (0.30 mole) erythromycin base in one liter of methylene chloride and sixty milliliters of triethylamine while the temperature of the reaction mixture was held at fifteen to twenty degrees centigrade by external cooling. The resulting solution was allowed to warm to room temperature over a period of one hour, stirred an additional hour, and allowed to stand overnight. Three liters of diethyl ether was added slowly, with stirring, in order to avoid gumming up of the product as it precipitated. The mixture was then stirred two hours, filtered, washed twice with one-liter portions of ether, and dried at fifty degrees centigrade under reduced pressure. The product weighed 208 grams (75 percent) and melted at 215–220 degrees centigrade (decomposition). A second crop of 21.3 grams (7.7 percent) was obtained by working up the mother liquors.

Melting point: 212–220 degrees; $[\alpha]_D$ minus 87 degrees (95 percent ethanol).

For analysis one gram of crop 1 was dissolved in fifty milliliters methylene chloride, filtered and reprecipitated with 175 milliliters of ether. The analytical product was then filtered, and dried at fifty degrees centigrade under reduced pressure.

Analysis.—Found: C, 55.64; H, 8.41; N, 1.72; S, 3.61. Optical rotation: $[\alpha]_D$ minus 84 degrees (95 percent ethanol).

Infrared analysis has confirmed the structure of the compound as that of the o-sulfobenzoate ester rather than the o-carboxybenzenesulfonate ester.

This product was found to be extremely insoluble in water (<0.01 mgm./ml.) whereas erythromycin base is soluble to the extent of approximately two mgm./ml.

In spite of the fact that this compound was prepared in the presence of triethylamine, a stronger base than erythromycin, the triethylamine salt was not formed.

By substituting the o-sulfobenzoic anhydride by equivalent amounts of 4-methyl-2-sulfobenzoic anhydride, 4-nitro-2-sulfobenzoic anhydride, 4-amino-2-sulfobenzoic anhydride, 3-bromo-2-sulfobenzoic anhydride, 3,6-dichloro-2-sulfobenzoic anhydride, 3,6-dibromo-2-sulfobenzoic anhydride, 3,6-diiodo-2-sulfobenzoic anhydride, 3,5,6-triiodo-2-sulfobenzoic anhydride, 3,5,6-tribromo-2-sulfobenzoic anhydride, 3,4,5,6-tetrachloro-2-sulfobenzoic anhydride, 3,4,5,6-tetrabromo-2-sulfobenzoic anhydride, 3,4,5,6-tetraiodo-2-sulfobenzoic anhydride, and 8-sulfo-1-naphthoic anhydride, there are obtained erythromycin 4-methyl-2-sulfobenzoic ester, erythromycin 4-nitro-2-sulfobenzoic ester, erythromycin 4-amino-2-sulfobenzoate ester, erythromycin 3-bromo-2-sulfobenzoate ester, erythromycin 3,6-dichloro-2-sulfobenzoate ester, erythromycin 3,6-dibromo-2-sulfobenzoate ester, erythromycin 3,6-diiodo-2-sulfobenzoate ester, erythromycin 3,5,6-triiodo-2-sulfobenzoate ester, erythromycin 3,5,6-tribromo-2-sulfobenzoate ester, erythromycin 3,4,5,6-tetrachloro-2-sulfobenzoate ester, erythromycin 3,4,5,6-tetrabromo-2-sulfobenzoate ester, erythromycin 3,4,5,6-tetraiodo-2-sulfobenzoate ester, and erythromycin 8-sulfo-1-naphthoate ester.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. The carboxylic acid mono ester of erythromycin and an aromatic sulfo carboxylic inner anhydride selected from the class consisting of (1) o-sulfobenzoic anhydride in which the benzene nucleus may carry substituents selected from the class consisting of lower alkyl, halogen, nitro, and amino groups, and (2) 8-sulfo-1-naphthoic anhydride.

2. A compound having the formula:

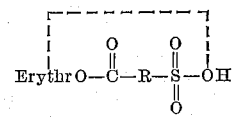

in which Erythr is the erythromycin radical and R is selected from the class consisting of lower ortho-arylene radicals of the benzene series and the peri-naphthalene radical, said compound being characterized by its insolubility in water and aqueous solutions of strong bases.

3. A compound according to claim 2 in which R is the ortho phenylene radical.

4. Erythromycin o-sulfobenzoate ester.

5. The process which comprises condensing erythromycin and an aromatic sulfo carboxylic inner anhydride selected from the class consisting of (1) o-sulfobenzoate anhydride in which the benzene nucleus may carry substituents selected from the class consisting of lower alkyl, halogen, nitro, and amino groups and (2) 8-sulfo-1-naphthoic anhydride in an inert solvent at a temperature between about minus ten and about sixty degrees centigrade.

6. A process according to claim 5 in which the anhydride is o-sulfobenzoic anhydride.

7. A process according to claim 5 in which the aromatic sulfo carboxylic inner anhydride is added to a solution of erythromycin obtained by extracting a fermentation beer containing erythromycin with a water-immiscible solvent.

8. The process according to claim 5 in which the inert solvent is methylene chloride.

9. The process according to claim 6 in which the inert solvent is methylene chloride, and in which the reagents are in the proportion of about 1 to about 1.25 moles of inner anhydride for each mole of erythromycin.

10. A process which comprises condensing erythromycin and an aromatic sulfo carboxylic inner anhydride having the formula:

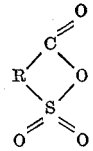

in which R is selected from the class consisting of lower orthoarylene radicals of the benzene series and the peri-napthalene radical in an inert solvent at a temperature between about minus 10 and about 60 degrees centigrade.

(References on following page)

References Cited in the file of this patent

UNITED STATES PATENTS

| | | |
|---|---|---|
| 2,653,899 | Bunch et al. | Sept. 29, 1953 |
| 2,662,906 | Edgerton | Dec. 15, 1953 |

FOREIGN PATENTS

| | | |
|---|---|---|
| 600,215 | Great Britain | Apr. 2, 1948 |

OTHER REFERENCES

Moreay et al., Chem. Abs., 44, 3678 (1950).
Ledrut et al., Chem. Abs., 42, 8188 (1948).
Amiard et al., Bull. Soc. Chim. 512–3 (1947).
Sylvester et al., 2nd Ann. Sym. on Antibiotics, October 1954, paper No. 41.